United States Patent [19]
Pinard et al.

[11] Patent Number: 5,454,032
[45] Date of Patent: Sep. 26, 1995

[54] METHOD OF ESTABLISHING COMMUNICATION LINK TO ONE OF MULTIPLE DEVICES ASSOCIATED WITH SINGLE TELEPHONE NUMBER

[75] Inventors: Deborah L. Pinard; Vishwanath K. Raju; Michael C. Rehder, all of Kanata, Canada

[73] Assignee: Mitel Corporation, Ontario, Canada

[21] Appl. No.: 58,937

[22] Filed: May 7, 1993

[51] Int. Cl.[6] .............................. H04M 1/60; H04M 9/00; H04M 13/00; H04M 3/42

[52] U.S. Cl. ..................... 379/167; 379/171; 379/177; 379/182; 379/211; 379/185; 379/61

[58] Field of Search ............................. 379/156, 167, 379/177, 183, 184, 165, 201, 205, 207, 211, 219, 161, 63, 61, 64, 171, 172, 182, 167

[56] References Cited

U.S. PATENT DOCUMENTS 5,206,901  4/1993  Harlow et al. .......................... 379/211
5,251,248  10/1993  Tokunaga et al. .................. 379/211 X Primary Examiner—Stephen Chin
Assistant Examiner—Paul Loomis
Attorney, Agent, or Firm—Charles E. Wands

[57] ABSTRACT

A method of establishing a telephone communication link from a calling line to one of plural peripheral devices associated with a single telephone number in a central office telephone switching system or PBX is comprised of storing in a memory a first table of directory numbers and equipment identifiers associated with each directory number, storing in a memory a second table of references to physical peripheral devices associated with each equipment identifier, receiving a request for service to a particular directory number, accessing the first table using the particular directory number and obtaining references to all equipment identifiers associated therewith, accessing the second table using the particular equipment identifiers associated with the particular directory number and identifying the particular physical peripheral devices associated with the particular identifiers, ringing all of the particular physical peripheral devices, detecting one of the particular physical devices going off-hook, ceasing ringing of all the particular peripheral devices, and establishing a communication link only to the one physical device. One of the devices can be a wired telephone set, and another a cellular phone, which can be associated with a different switching office than the wired telephone set.

4 Claims, 3 Drawing Sheets

DIRECTORY NUMBER SERVICE ASSIGNMENT — 29

| DIR NO. | EQUIP NO. | ASSOCIATED EQUIP NO. | MOBILE GROUP | ASSOCIATED MOBILE GROUP | ASSOCIATED ROUTE |
|---|---|---|---|---|---|
| 5110101 | 1,1,1,1 | 1,2,2,1 | - | - | - |
| 5110102 | 1,1,1,2 | 1,2,2,2 | - | - | - |
| 5110103 | 1,2,2,1 | - | - | - | - |
| 5110104 | 2,3,4,1 | - | - | - | - |
| 5110105 | - | 1,1,1,3 | 5 | - | - |
| 5110106 | 1,1,1,4 | - | - | 6 | - |
| 5110107 | 1,1,1,5 | - | - | - | 1 |

— 29

| GROUP NO. | CARD 1 | CARD 2 | ...ETC. |
|---|---|---|---|
| . | | | |
| . | | | |
| 5 | 1,1,17 | 1,2,17 | ... |
| 6 | 1,2,17 | 3,2,17 | ... |
| . | | | |
| . | | | |

METHOD OF ESTABLISHING COMMUNICATION LINK TO ONE OF MULTIPLE DEVICES ASSOCIATED WITH SINGLE TELEPHONE NUMBER

FIELD OF THE INVENTION

This invention relates to telephone systems and particularly to a telephone system in which a single directory number is associated with a plurality of different kinds of peripheral devices such as a telephone line, a trunk of wireless devices, a mobile phone, etc.

BACKGROUND TO THE INVENTION

In recent years it has become commonplace for a subscriber to have various communication devices with which he can communicate, e.g. a home telephone, a cellular telephone, a facsimile line, etc. These devices may be connected to line circuits of different telephone switching systems.

There have been generally two ways of automatically establishing a calling link to these devices. The first way is to have separate telephone numbers for each device. In some such cases, line concentration can be utilized, e.g. in a key telephone system several key telephone sets are used, each having access to an equal or fewer number of lines. In order to make it appear that only a single telephone number is used, line equivalence for plural directory numbers is provided at the main switching office to which the key telephone system trunks are connected.

A second way is used to utilize a single directory number which rings plural devices connected in parallel to a single line, and after one of the devices answers the call, a specialized tone received from the line from a calling device indicates which specialized device is intended. Switching to that device can be then done either manually or automatically. This procedure is sometimes implemented with a facsimile machine connected to the same telephone line as a telephone set.

However none of the above systems allow different kinds of devices which can be connected to different line circuits within a switching system or in different switching systems, which are designated to a single subscriber, to be accessed using a single directory number, and wherein use of one device blocks out the use of the others.

Such systems also do not allow simultaneous ringing of a home telephone device and cellular telephone or other wireless device, using the same telephone number, to reach a particular subscriber, which would be highly desirable from the user's point of view.

SUMMARY OF THE PRESENT INVENTION

The present invention provides a method for a wide variety of different kinds of peripheral devices to be rung using a single directory number which is typically associated with a single subscriber. When the directory number is dialed from a calling line, all of the peripheral devices ring. After one of the ringing devices is answered, going off-hook, a communication link is established from the calling line only to that peripheral device which has gone off-hook. The remaining devices connected to the switching system are blocked out from use.

Thus the subscriber can be called using a single telephone number which can be easily remembered by calling parties, and the called party can use whatever peripheral device is most convenient to answer the call, e.g. his home telephone, a cellular telephone, etc.

It should be noted that a key system, while ringing all telephones, utilizes plural trunks, each of which has a distinct directory number, while the present invention utilizes a single directory number by which the subscriber is known. PABX hunt groups ring only a single telephone in the group, while in the present invention, all telephones and other devices are rung. Ringing only a single device in the present invention would be of no use.

In accordance with an embodiment of the invention, a method of establishing a telephone communication link from a calling line to one of plural peripheral devices associated with a single telephone number in a telephone switching system is comprised of storing in a memory a first table of directory numbers and equipment identifiers associated with each directory number, storing in a memory a second table of references to physical peripheral devices associated with each equipment identifier, receiving a request for service to a particular directory number, accessing the first table using the particular directory number and obtaining references to all equipment identifiers associated therewith, accessing the second table using the particular equipment identifiers associated with the particular directory number and identifying the particular physical peripheral devices associated with the particular identifiers, ringing all of the particular physical peripheral devices, detecting one of the particular physical devices going off-hook, ceasing ringing of all the particular peripheral devices, and establishing a communication link only to the one physical device.

In accordance with another embodiment, a method of establishing a telephone communication link is comprised of dialing a telephone number associated with a single subscriber, seizing a first telephone line associated with a wired telephone set and seizing a second telephone line associated with a cellular telephone, ringing both first and second telephone lines, and establishing a talking channel to one of the telephone lines which first experiences an off-hook condition.

BRIEF INTRODUCTION TO THE DRAWINGS

A better understanding of the invention will be obtained by reference to the detailed description below, in conjunction with the following drawings, in which.

DETAILED DESCRIPTION OF THE INVENTION

Figure 1:
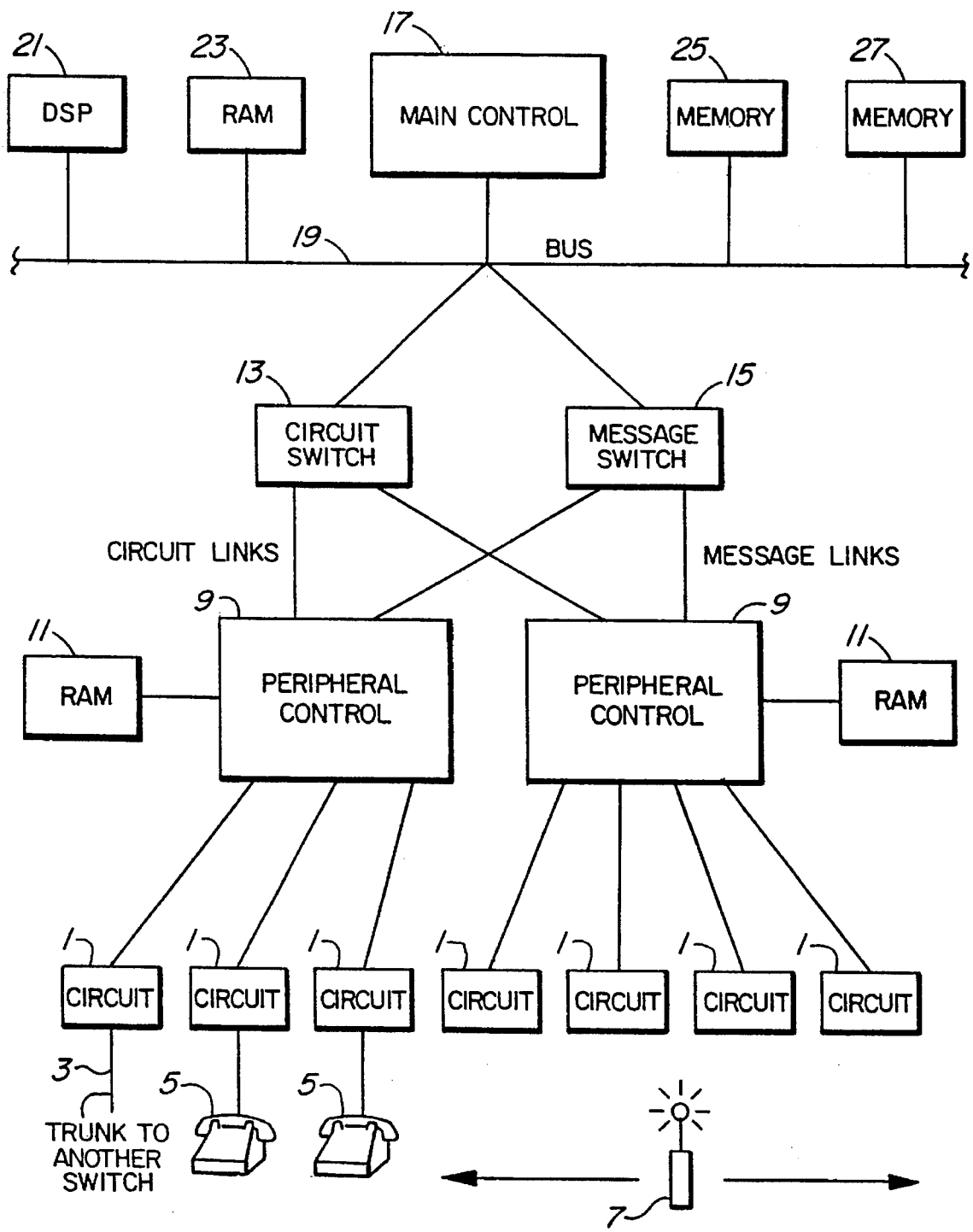
FIG. 1 is a block diagram of a system in which the process can be carried out.

Turning to FIG. 1, a basic switching system such as that sold by Mitel Corporation under the designation SX2000 is shown. A system such as this is described for example, in U.S. Pat. Nos. 4,616,360 and 4,615,028 invented by Conrad Lewis et al, incorporated herein by reference.

In general, peripheral circuits 1 are connected to peripheral devices such as trunk 3, telephone sets 5, etc. As described in U.S. patent application Ser. No. 875,981 filed Apr. 29th, 1992 invented by Martin Handforth (incorporated herein by reference), a wireless device 7 is associated with individual, varying peripheral circuits 1 as it passes into various "cells".

The peripheral circuits are connected to peripheral controllers 9, which have associated memories 11. The peripheral controllers 9 are connected to circuit switch 13 and to message switch 15, which switches are connected to a main controller 17 via bus 19. A digital signal processor is also connected to bus 19 for generating signalling tones, etc.

The main controller 17 communicates with the peripheral circuits by transmitting signals through the message switch to a peripheral controller 9. Communication channels between peripheral devices are made through the peripheral circuits, peripheral controller 5 and circuit switch 13.

The operational control programs for main controller 17 and other data is stored in random access memory 23, which is connected to bus 19.

In accordance with the present invention, a first table is stored in a memory 25, which memory is connected to bus 19 for access by main controller 17. That table is comprised of directory numbers and the plural equipment identifiers associated with each directory number, as will be described in more detail below.

Also in accordance with this invention, a second table is stored in a memory 27, which memory is also connected to bus 19 for access by main controller 17. The second table contains references to physical peripheral devices associated with each equipment identifier.

Memories 25 and 27 can be physically combined, and combined with memory 23, if desired.

Figure 2:
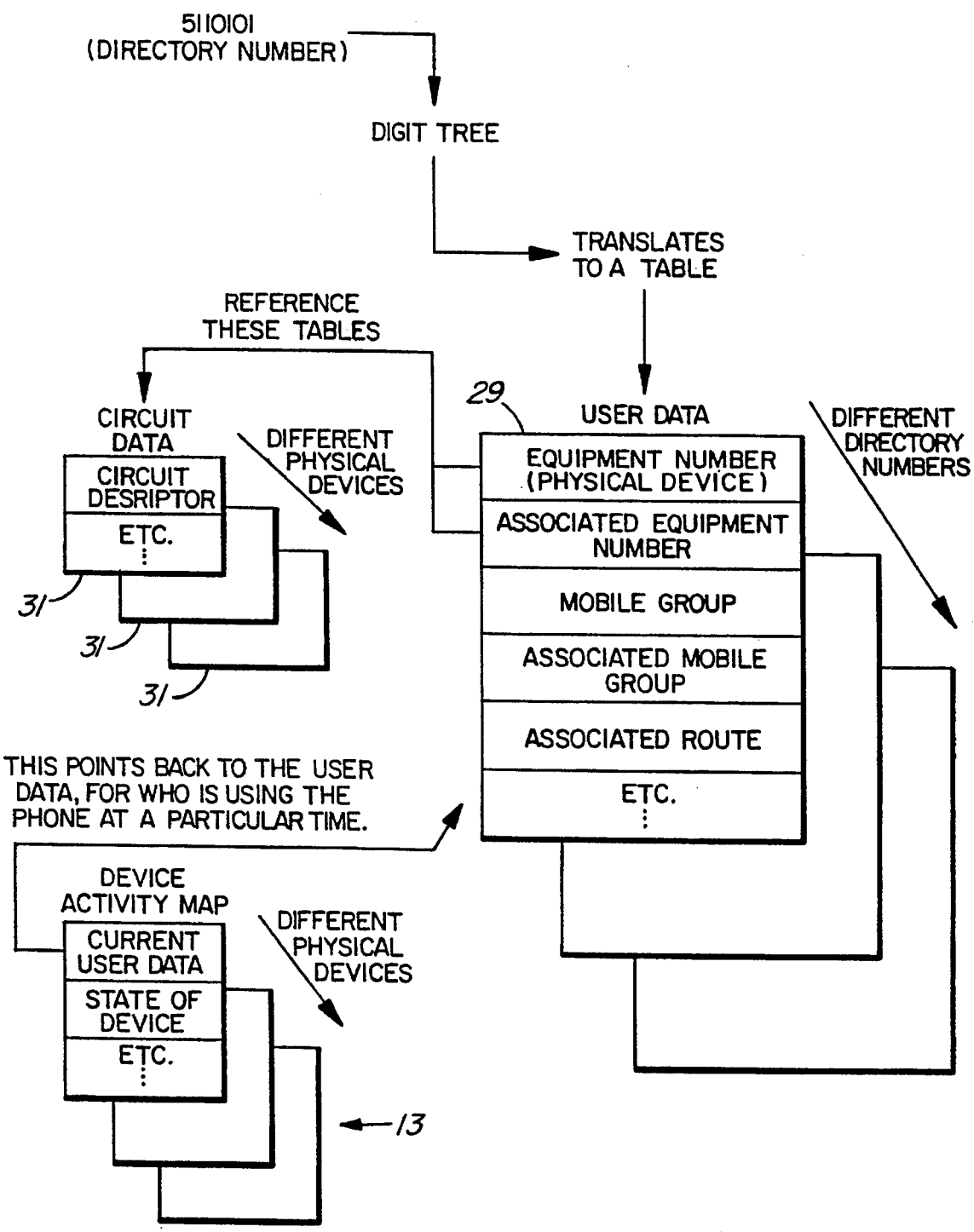
FIG. 2 is a partial block diagram and partial flow chart illustrating how the process is carried out.
Figures 3A, 3B, 3C:
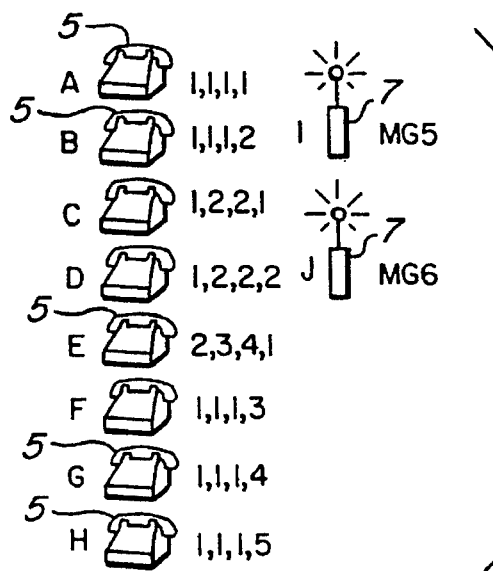
FIG. 3A illustrates the content of the memory as well as designators for various peripherals, in a described example process.
FIG. 3B illustrates a sub-table of the first table.
FIG. 3C illustrates various physical devices associated with equipment designators.

Turning briefly to FIG. 2, a portion of the first table 29 is shown. In FIG. 3C, a more complete table 29 is shown.

Associated with each directory number is a primary equipment number, e.g. the equipment number of a stationary wired telephone set, such as the subscriber may have at his home. Also associated with that directory number is an associated equipment number such as the equipment number of a second telephone set if the subscriber has one, a designation of a mobile telephone group, a designation of an associated mobile group number, the designation of an associated route, such as a trunk to another telephone switching system, etc., relating to the terminating devices that the subscriber may have. While table 29 in FIG. 2 illustrates typical kinds of equipment numbers that might be associated with a single directory number, table 29 in FIG. 3A illustrates an entire array, which could make up the table for directory numbers 5110101–5110107. The table spaces are left blank or with a nil designation entry where they do not exist.

Directory numbers subject to this invention are stored in a digit tree in RAM 23 or in another auxiliary memory, which is accessible by the main controller 17 when an incoming call has been received. The number dialed can be processed in the digit tree and either be led immediately to a flag which indicates that the call is to be processed normally (that there is no duplicate equipment and that the subscriber does not have this class of service), or to a directory number entry to table 29.

As may be seen in FIG. 3A, associated in the table with directory number 5110101 is equipment number 1,1,1,1 and associated equipment number 1,2,2,1. The latter two numbers designate references to physical peripheral devices associated with each equipment identifier, stored in a second table 31. Table 31 contains circuit descriptors of various physical devices for use by the main controller 17. Thus, for example, the equipment number 1,1,1,1 and associated equipment number 1,2,2,1 designate circuit descriptors in table 31, to physical wired telephone devices shown as A and C in FIG. 3C.

Telephone set A might be located at the end of a telephone line in the home of a subscriber, and telephone set C might be located at the end of a second telephone line in the barn of the same subscriber, both of which being rung using the same telephone number.

With main controller 17 accessing the circuit descriptor of telephone sets A and C, a message is sent via message switch 15 to a peripheral controller to which its subscriber lines of telephone sets A and C, e.g. 5 in FIG. 1 are connected, requesting that the peripheral circuits associated therewith should be seized. The peripheral controller seizes both lines, causing both telephone sets A and C to ring.

The main controller 17 also reserves a message path from a calling line which has dialed directory number 5110101 through circuit switch 13 to both line circuits of telephone sets A and C, but does not yet connect the path through.

Both telephone sets ringing, the subscriber answers one, going off-hook. The peripheral circuit and thus the peripheral control senses this, sending a message back to main controller 17 through message switch 15. The main control, returning a message through message switch 15, causes the peripheral control 9 to release the line circuit which has not gone off-hook, ceases ringing both line circuits, and sends a message to circuit switch 13, and through message switch 15 to the associated peripheral control, to connect a communication channel through from the calling line to the telephone set which has gone off-hook.

In case one of the devices is a wireless device 7, the line circuit to be used is designated as described in U.S. Pat. No. 4,866,732, issued Sep. 12th, 1989 invented by M. Carey et al, or as described in the aforenoted U.S. patent application Ser. No. 875,981. After the particular peripheral line circuit associated with the wireless device or the location of the wireless device has been established, then a seize message for the appropriate line circuit is sent by the main control as described above. The invention would operate in an analogous manner if one of the devices were a cellular telephone channel to which a line circuit interfaces.

Turning back to FIGS. 3A and 3B, FIG. 3B being a sub-table of FIG. 3A which further identifies particular line circuit cards associated with mobile groups, routes (trunks) etc., what follows will be a brief explanation of which telephone sets, mobile devices, etc. are rung depending on various directory numbers which have been dialed, as shown in the first column of FIG. 3A.

When 5110101 is dialed, both A and C (FIG. 3C) ring.

When 5110102 is dialed, both B and D ring.

When 5110103 is dialed, C rings.

When 5110104 is dialed, E rings.

When 5110105 is dialed, I is found and rung, F rings.

When 5110106 is dialed, G rings, J is found and rung.

When 5110107 is dialed, H rings, and a trunk from route 1 is selected and outpulsed or otherwise signalled on.

It should be noted that the present invention can be used to ring a device which is connected to another telephone switching system. This is the sequence that occurs when the example directory number 5110107 is dialed. In this case, stored in table 29 in association with that directory number is the designation of example equipment number 1,1,1,5 and an associated route 1, which designates a trunk to a particular switching office, and from table 31, a directory number at the other switching office to signal and thus to ring.

Thus in case of dialing of a directory number 5110107, telephone set H designated by equipment number 1,1,1,5 is to be rung, and upon receiving the translation of associated (trunk) route 1 and the physical device (directory number of device H) in table 31, a trunk to the appropriate remote switching office is seized, and the directory number digits which designate the physical device associated with that remote switching office are outpulsed from the peripheral circuit 1 associated with e.g. trunk 3.

Stored in RAM 23 is a device activity map 33. The active or busy state of each device must be able to be known by the main controller 17, which is recorded in the device activity map. Thus if a call is in progress between one of the devices associated with a single directory number and another line, a pointer from that one device to table 29 indicates to the main controller 17 which other associated devices are related to that single directory number. Using this information, if one of the devices associated with a particular directory number is busy, the main control will not allow any other device associated with the same directory number to be used at the same time. Therefore, after an incoming call which rings all of the devices associated with the same associated directory number is answered on one of the devices, if another of the device associated with the same directory number goes off-hook, there will be silence. Thus a request for service of one of the other devices associated with the directory number which already has one device busy will cause the main control to check to see if the other device is associated with the already busy directory number.

Another way of accomplishing this result is to have a device state indicator of every single device stored in RAM 23, and if one of the devices associated with a single directory number becomes busy, looking up table 29 allows main controller 17 to store a busy indication in the device activity map of all of the peripheral devices associated with the same directory number.

In the case of a mobile user, the mobile group equipment numbers would be searched for a matching user. In the case of a route, all of the trunk in the route are searched to see whether they are being used by the associated directory number.

In contrast to a key system, call forwarding can be used and applied to the directory number. Call waiting or camp-on can also be used on the device that has received the call.

If a peripheral device originates a call while all of the associated devices are idle, then the main controller 17 processes the call from that originating device in a normal manner. However a busy indication is stored in the device activity map relating to all of the other associated devices. If a party should attempt to make a call on one of the other peripheral devices associated with a directory number in which a call has already been originated, it will be greeted with silence. This ensures security of the call.

A person understanding this invention may now conceive of alternative structures and embodiments or variations of the above. All of those which fall within the scope of the claims appended hereto are considered to be part of the present invention.

We claim:

1. A method of establishing a telephone communication link from a calling line to one of plural peripheral devices associated with a single telephone number in a telephone switching system comprising:

(a) storing in a memory a first table of directory numbers and equipment identifiers associated with each directory number, (b) storing in a memory a second table of references to physical peripheral devices associated with each equipment identifier, (c) receiving a request for service to a particular directory number, (d) accessing the first table using said particular directory number and obtaining references to all equipment identifiers associated therewith, (e) accessing the second table using the particular equipment identifiers associated with said particular directory number and identifying the particular physical peripheral devices associated with said particular identifiers, (f) ringing all of said particular physical peripheral devices, (g) detecting one of said particular physical devices going off-hook, (h) ceasing ringing of all said particular peripheral devices, and (i) establishing a communication link only to said one physical device, (j) in which the switching system is comprised of a main controller having access to said memories, a message switch and a circuit switch controllable by the controller, a peripheral control to which the physical peripheral devices are connected, the peripheral control being connected to the circuit and message switches, further including the steps of the main controller accessing said tables and sending a message via the message switch to the peripheral control to seize and ring all said particular peripheral devices, reserving communication channels through said circuit switch from the calling line to all of said peripheral devices, and after detecting said one of the physical devices going off-hook, releasing all said particular physical devices except the one off-hook, releasing all the reserved communication channels to all said particular physical devices except the one off-hook, and establishing the reserved communication channel through the circuit switch from the calling line to the off-hook particular physical device.

2. A method as defined in claim 1, in which one of said particular devices is a wireless device, and including the step, following the second table accessing step, of determining the location of the wireless device.

3. A method as defined in claim 2, in which one of said particular devices is a trunk, and in which the ringing step includes the step of seizing a trunk and signalling digits over said trunk to cause another switching system to ring a peripheral device connected thereto.

4. A method as defined in claim 3, in which the wireless device is a cellular telephone line.

* * * * *